United States Patent
Okamura et al.

(10) Patent No.: US 6,533,460 B2
(45) Date of Patent: Mar. 18, 2003

(54) HYDRODYNAMIC TYPE POROUS OIL-IMPREGNATED BEARING

(75) Inventors: Kazuo Okamura, Mie-ken (JP); Yasuhiro Yamamoto, Kuwana (JP); Isao Komori, Kuwana (JP); Natsuhiko Mori, Mie-ken (JP); Makoto Shiranami, Inazawa (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 10/022,399

(22) Filed: Dec. 20, 2001

(65) Prior Publication Data

US 2002/0048418 A1 Apr. 25, 2002

Related U.S. Application Data

(62) Division of application No. 09/921,602, filed on Aug. 6, 2001, which is a division of application No. 09/033,651, filed on Mar. 3, 1998, now Pat. No. 6,299,356.

(30) Foreign Application Priority Data

| Mar. 6, 1997 | (JP) | 9-51857 |
| Mar. 31, 1997 | (JP) | 9-81535 |
| Mar. 31, 1997 | (JP) | 9-81536 |

(51) Int. Cl.[7] ............................................. F16C 17/02
(52) U.S. Cl. ...................................... 384/114; 384/292
(58) Field of Search ............................... 384/292, 114, 384/118, 291, 107

(56) References Cited

U.S. PATENT DOCUMENTS

| 3,238,000 A | 3/1966 | Muijderman et al. |
| 3,659,324 A | 5/1972 | Murray .................... 29/149.5 |
| 4,875,263 A | 10/1989 | Furumura ................ 29/149.5 |
| 5,339,523 A | 8/1994 | Hasegawa ................ 29/898.02 |
| 5,448,121 A | 9/1995 | Tada ........................... 384/292 |
| 5,538,347 A | 7/1996 | Itoh et al. |
| 5,574,591 A | 11/1996 | Suzuki et al. |
| 5,683,183 A | * 11/1997 | Tanaka et al. ............. 384/114 |
| 5,769,544 A | 6/1998 | Suzuki et al. ............... 384/115 |

FOREIGN PATENT DOCUMENTS

| DE | 2162901 | 6/1973 |
| GB | 0671268 | 4/1952 |
| GB | 672268 | 5/1952 |
| GB | 2 064 676 A | 11/1980 |
| GB | 2064676 | 6/1981 |
| GB | 2316453 | 2/1998 |
| JP | 57/154518 | 9/1982 |
| JP | 03/071944 | 3/1991 |
| JP | 070174135 | 7/1995 |

* cited by examiner

Primary Examiner—Lenard A. Footland
(74) Attorney, Agent, or Firm—Arent Fox Kintner Plotkin & Kahn

(57) ABSTRACT

The porous oil-impregnated bearing 1 comprises a bearing body 1a made of a porous material, and oil retained in the pores of the bearing body 1a by impregnation with lubricating oil or lubricating grease. The inner peripheral surface of the bearing body 1a is formed with a bearing surface 1b opposed to an outer peripheral surface of a shaft to be supported, with a bearing clearance defined therebetween. The bearing surface 1b has a first region m1 in which a plurality of hydrodynamic pressure generating grooves 1c inclined in one direction with respect to the axial direction are circumferentially disposed, a second region m2 which is axially spaced from said first region m1 and in which a plurality of hydrodynamic pressure generating grooves 1c inclined in the other direction with respect to the axial direction are circumferentially disposed, and an annular smooth region n disposed between the first and second regions m1 and m2.

4 Claims, 13 Drawing Sheets

HYDRODYNAMIC TYPE POROUS OIL-IMPREGNATED BEARING

This is Division of Application Ser. No. 09/921,602 filed Aug. 6, 2001, which in turn is a Divisional application of parent application Ser. No. 09/033,651 filed Mar. 3. 1998, now U.S. Pat. No. 6,299, 356. The disclosure of the prior application(s) is hereby incorporated by reference herein in its entirety.

BACKGROUND OF THE INVENTION

The present invention relates to a hydrodynamic type porous oil-impregnated bearing being impregnated with lubricating oil or lubricating grease in a bearing body of porous substance, such as sintered metal, to have a self-lubricating function, supporting a slide surface of a shaft in a non-contact manner by a lubricating oil film produced in a bearing clearance due to hydrodynamic function of hydrodynamic pressure generating grooves in a bearing surface. The bearing of the invention is suitable for use particularly in machines and instruments of which high rotation accuracy at high speed is required, such as spindle motors for polygon mirror of laser beam printer (LBP), magnetic disk drives (HDDs), or the like, and in machines and instruments which are driven at high speed with a large imbalance load produced in that a disk is mounted thereon, such as spindle motors for DVD-ROM, or the like.

In such small-sized spindle motors associated with information-handling devices, improved rotation performance and cost reduction are required, as a means therefor, possibility of changing bearings for the spindle from a rolling bearing to a porous oil-impregnated bearing has been investigated. However, since a porous oil-impregnated bearing is a kind of cylindrical bearing, it tends to produce unstable vibrations where the shaft eccentricity is small, inducing the so-called whirl in which the shaft is subjected to a revolving vibration at a rate which is half the rotary speed. Accordingly, it has heretofore been attempted to form hydrodynamic pressure generating grooves, such as the herringbone or spiral shape, in a bearing surface, so as to produce a lubricating oil film in a bearing clearance by the function of the hydrodynamic pressure generating grooves which accompanies the rotation of the shaft, to thereby support the shaft in a noncontact manner (hydrodynamic type porous oil-impregnated bearing).

A porous oil-impregnated bearing being formed hydrodynamic pressure generating grooves in a bearing surface is disclosed in Japanese Utility Model Koukoku Shouwa 63-19627. In this prior art, a region of the hydrodynamic pressure generating grooves in the bearing surface is worked to seal surface openings thereon. Such construction, however, has the following drawback. Since the surface openings on the region of the hydrodynamic pressure generating grooves completely sealed, the circulation of oil, which is the greatest feature of the porous oil-impregnated bearing, is obstructed. Therefore, the oil which has been exuded in the bearing clearance is forced into the bent portions of the groove region by the action of the hydrodynamic pressure generating grooves and stays there. A great shearing action is present in the bearing clearance, and this shearing force and frictional heat cause the oil staying in the groove region to be denatured, while a rise in temperature tends to accelerate oxidative deterioration of the oil. Therefore, the bearing life is shortened. On the other hand, besides plastic processing, it has been proposed to employ coating or the like as another means for applying a surface treatment, however, it is necessary that the thickness of such coating film be less than the groove depth, and it is very difficult to apply a coating film which is some $\mu$m thick solely to the groove region.

In order to secure the rotation accuracy of the shaft, a plurality of bearings, e.g., two bearings, are usually used. Further, bearings are used mostly by being pressed into a housing. Thus, to secure a substantial alignment of the two bearings, there has been employed a method in which two bearings are simultaneously pressed into the housing after a correcting pin is inserted into the housing. In the case of a bearing having hydrodynamic pressure generating grooves formed in the bearing surface, if forcible correction is made by using the correction pin, this will result in the correction pin cutting into the hydrodynamic pressure generating grooves in the bearing surface to collapse said grooves, making it impossible to obtain a stabilized hydrodynamic effect. On the other hand, the operation of press-fitting without using the correction pin will fail to provide the necessary alignment between the bearings. Further, Japanese Patent Kokai Heisei 2-107705 discloses an arrangement in which two bearing surfaces are formed in axially spaced from each other and in which a region between the bearing surfaces has a greater diameter than that of the bearing surfaces. This arrangement, though free from the aforesaid problems in practice, cannot prevent the unstable vibrations, such as whirl, because of the lack of hydrodynamic pressure generating grooves in the bearing surfaces.

As for a method of forming hydrodynamic pressure generating grooves in bearing surfaces, such a method has been a known that comprises the steps of inserting into an inner peripheral surface of a bearing blank a shaft-like jig which holds a plurality of circumferencially equispaced balls harder than the bearing blank, imparting a spiral movement to the balls through the rotation and advance of the jig while pressing the balls against the inner peripheral surface of the blankm, thereby to plastically work a region of hydrodynamic pressure generating grooves method of, which method (Japanese Patent 2541208). In this method, the blank bulges in a region adjacent the hydrodynamic pressure generating grooves during forming, and such bulge has to be removed as by lathing or reaming (Japanese Patent Kokai Heisei 8-232958). For this reason, the number of manufacturing steps increases. Further, a driving mechanism and an advancing mechanism for the jig are required, thus complicating the manufacturing equipment.

SUMMARY OF THE INVENTION

An object of the present invention is to secure the appropriate circulation of oil between the interior of the bearing body and the bearing clearance to suppress the deterioration of the oil in the bearing clearance, thereby increasing the bearing life, and improving the effect of formation of lubricating oil film in the bearing clearance, thus increasing the bearing rigidity and minimizing the shaft deflection due to imbalance load or the like.

Another object of the invention is to provide an arrangement which is capable of preventing unstable vibrations such as whirl and eliminating the inconveniences (such as the loss of shape of hydrodynamic pressure generating grooves, and axial misalignment) which are involved in the installing operation.

A further object of the invention is to provide a production method which facilitates the forming of a bearing surface having inclined hydrodynamic pressure generating grooves by using simple equipment and fewer steps and with high accuracy.

To achieve said objects, the invention provides a hydrodynamic type porous oil-impregnated bearing comprising a porous bearing body being formed with bearing surface on an inner peripheral surface thereof, and oil retained in pores of the bearing body by impregnation of lubricating oil or lubricating grease, wherein the bearing surface has a first region in which a plurality of hydrodynamic pressure generating grooves inclined in one direction with respect to the axial direction are circumferentially disposed, a second region which is axially spaced from the first region and in which a plurality of hydrodynamic pressure generating grooves inclined in the other direction with respect to the axial direction are circumferentially disposed, and an annular smooth region positioned between the first and second regions. The bearing surface of the bearing body is opposed to an outer peripheral surface of a shaft to be supported, with a bearing clearance defined therebetween. When a relative rotation occurs between the bearing body and the shaft, the hydrodynamic pressure generating grooves mutually reversely disposed in the first and second regions of the bearing surface cause the oil in the bearing clearance to be drawn to the annular smooth region and collect in the latter, so that the oil film pressure in the smooth region is increased. For this reason, the effect of formation of lubricating oil film is high. Further, since the smooth region has no groove formed therein, the bearing rigidity is high as compared with the construction in which hydrodynamic pressure generating grooves axially continuous. Therefore, the shaft deflection can be minimized. Further, it is possible to avoid the lubricating oil film distribution becoming nonuniform owing to variations in surface openings on the bearing surface. By the term "surface openings" is meant those portions of pores of a porous body which open to an outer surface thereof. In the present invention, the surface openings are present in the entire region of the bearing surface including the region formed with the hydrodynamic pressure generating grooves.

Percentage of area of surface openings in the smooth region of the bearing surface is preferably smaller than that of the first and second regions. By the term "percentage of area of surface openings" is meant the proportion of the total area of the surface openings in unit area of the outer surface. As a result, since the oil which is brought together in the smooth region by the hydrodynamic pressure generating grooves can hardly escape into the interior of the bearing body through the surface openings on the smooth region, the capacity of the produced lubricating oil film can be increased. Further, since an outer peripheral surface of the shaft is supported in a non-contact manner mainly by the lubricating oil film formed of the oil collected in the annular smooth region, the bearing rigidity is high.

The percentage of area of sureface openings is in the range of 5–30%, desirably 5–20%, for the first and second regions and 2–20%, desirably 2–15%, for the smooth region. If the percentage of area of surface openings on the first and second regions is less than 5%, the amount of oil to be fed from the interior of the bearing body to the bearing clearance decreases, resulting in insufficient formation of lubricating oil film. Reversely, if it exceeds 30%, the amount of oil which escapes into the interior of the bearing body becomes excessive, resulting in insufficient formation of lubricating oil films on the smooth region. Further, if the percentage of area of surface openings on the smooth region is less than 2%, the production of the bearing becomes difficult, leading to an increase in costs. Reversely, if it exceeds 20%, the amount of oil which escapes into the interior of the bearing body becomes excessive, resulting in insufficient formation of lubricating oil film.

In order to enhance the effect of formation of lubricating oil film on the smooth region, it is preferable that the hydrodynamic pressure generating grooves in the first region and those in the second region be symmetric with respect to the axial central region of the bearing surface.

At the start or stoppage of rotation, the outer peripheral surface of the shaft comes into instantaneously contact with the bearing surface of the bearing. At this time, they come into contact with each other in the axial end region of the bearing surface. Therefore, by tapering the axial opposite sides of the bearing surface such that the inner diameter increases toward the bearing ends (see FIG. 7), the area of their contact is increased when the apparatus is started or stopped, so that the non-contact state can be instantaneously established. The first and second regions may be tapered throughout or portions (associated with the bearing ends) of each of the first and second regions may be tapered. In addition, the area of the bearing surface other than the tapered surface is parallel with the axis.

In this case, the ratio of an increment $\Delta c$ in the inner diameter from the smooth region to the end of the bearing to the shaft diameter D is $\Delta c/D = 1/3000 - 1/200$, more desirably, $\Delta c/D = 1/3000 - 1/500$. If $\Delta c/D$ is less than 1/3000, the resulting taper is too small to prevent instantaneous contact, and if $\Delta c/D$ is greater than 1/200, the resulting taper is too large to provide a useful hydrodynamic effect.

It is possible to provide an arrangement comprising a porous bearing body being formed with a plurality of axially spaced bearing surfaces on an inner peripheral surface thereof, at least one of the plurality of bearing surfaces having inclined hydrodynamic pressure generating grooves, the inner diameter of the region between the bearing surfaces being greater than that of the bearing surfaces, and oil retained in the pores of the bearing body by impregnation of lubricating oil or lubricating grease. Such formation of a plurality of bearing surfaces in a single bearing solves the problem of axial alignment inherent in the case where a plurality of bearings are incorporated as in the prior art. More particularly, since the plurality of bearing surfaces are formed in a single bearing, there is no need to use a correcting pin to obtain axial alignment as in the case of prior art, and the loss of shape of the hydrodynamic pressure generating grooves due the use of such correcting pin does not occur, of course. The formation of inclined hydrodynamic pressure generating grooves in at least one bearing surface effectively prevents unstable vibrations such as whirl.

Provision of a level difference in the boundary between the bearing surface and the region between the bearing surfaces makes it possible to effectively reduce the torque loss in the region between the bearing surfaces.

If the axial section of the region between the bearing surfaces is drawn with a curve which continuous to the bearing surfaces, oil which exudes from the surface openings on the region between the bearing surfaces flows axially along such region, making it easier to feed the oil to the bearing surface, a fact which means effective use of oil and enhancement of formation of lubricating oil film.

The axial section of the region between the bearing surfaces may be drawn with an arc which is greatest in the middle of the region. The oil which has exuded from the surface openings on the region can be easily fed to the bearing surfaces on the opposite sides.

The outer diameter of an outer portion of the bearing body corresponding to at least one bearing surface is determined to be smaller than the outer diameter of an outer portion of the bearing body corresponding to the region between the bearing surfaces, whereby when the bearing body is press-fitted in a housing, deformation of the bearing surfaces under the press-fitting pressure can be prevented or reduced.

The bearing surface having inclined hydrodynamic pressure generating grooves can be formed by the following method: the method comprises the steps of inserting a forming pattern in an inner peripheral surface of a cylindrical porous blank, the forming pattern having a first forming portion for forming a region of hydrodynamic pressure generating grooves and a second forming portion for forming the other regions in the bearing, applying a compacting pressure to the porous blank to press the inner peripheral surface of the porous blank against the forming pattern, thereby simultaneously forming the region of hydrodynamic pressure generating grooves and the other region in the bearing surface on the inner peripheral surface of the porous blank. Alternatively, disposing the forming pattern in a die, filling powder metal material between the forming pattern and the die, applying a compacting pressure to the powder metal material to form a cylindrical compacted body, while simultaneously forming the region of hydrodynamic pressure generating grooves and the other region in the bearing surface on the inner peripheral surface of the compacted body. Release of the forming pattern can be effected by utilizing the spring-back of the porous blank due to removal of the compacting presuure, or by utilizing the spring-back of the compacted body due to removal of the compacting presuure.

DESCRIPTION OF PREFERRED EMBODIMENTS

Embodiments of the present invention will now be described.

Figure 1:
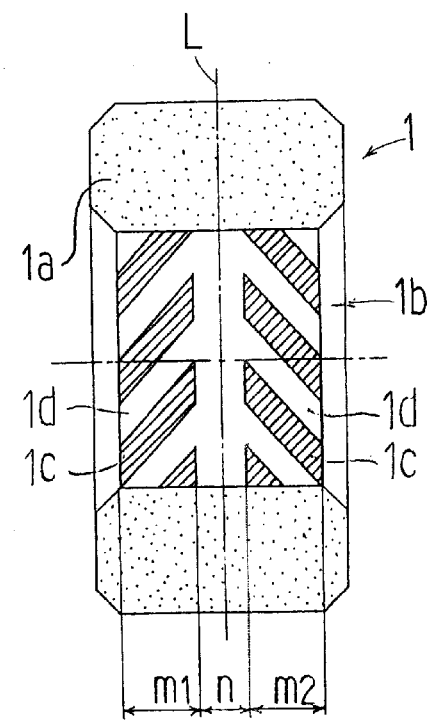
FIG. 1 is a longitudinal sectional view showing an embodiment of a hydrodynamic type porous oil-impregnated bearing.

FIG. 1 shows by way of example an embodiment of a hydrodynamic type porous oil-impregnated bearing. This hydrodynamic type porous oil-impregnated bearing 1 is used, for example, in connection with a scanner motor for a laser beam printer shown in FIG. 2, to support a spindle shaft 2 for rotation with respect to a housing 4, in a non-contact manner, the spindle shaft 2 being rotated at high speed by magnetic excitation force between a rotor 3 and a stator.

The porous oil-impregnated bearing 1 comprises a bearing body 1a made of a porous material, e.g., a sintered metal containing copper or iron, or both as a main component, and oil retained in the pores of the bearing body 1a by impregnation with lubricating oil or lubricating grease. The bearing body preferably contains copper in 20–95 wt %, and has density of 6.4–7.2 g/cm$^3$.

Tile inner peripheral surface of the bearing body 1a is formed with a bearing surface 1b opposed to an outer peripheral surface of a shaft to be supported, with a bearing clearance defined therebetween, the bearing surface 1b being formed with inclined hydrodynamic pressure generating grooves 1c. The bearing surface 1b in this embodiment comprises a first region m1 in which a plurality of hydrodynamic pressure generating grooves 1c inclined in one direction with respect to the axial direction are circumferentially disposed, a second region m2 which is axially spaced from said first region m1 and in which a plurality of hydrodynamic pressure generating grooves 1c inclined in the other direction with respect to the axial direction are circumferentially disposed, and an annular smooth region n disposed between the first and second regions m1 and m2. The ribs 1d (the regions between the hydrodynamic pressure generating grooves 1c) of the first region m1 and the ribs 1d (the regions between the hydrodynamic pressure generating grooves 1c) of the second region m2 are continuous to the smooth region n. The hydrodynamic pressure generating grooves 1c of the first region m1 and the hydrodynamic pressure generating grooves 1c of the second region m2 are symmetrical with respect to the axial centerline L of the bearing surface 1b. The bearing surface 1b has surface openings distributed over the entire area including the region where the hydrodynamic pressure generating grooves 1c are formed, it being arranged that the oil is circulated between the interior of the bearing body 1a and the bearing clearance through the surface openings of the bearing body 1a including the bearing surface 1b so as to support the outer peripheral surface of the shaft in a non-contact manner with respect to the bearing surface 1b. It is advisable that the percentage of area of surface openings on the smooth region n be equal or lower than that of the first and second regions m1 and m2.

When relative rotation takes place between the bearing body 1a and the shaft, the mutually reversely directed, inclined hydrodynamic pressure generating grooves 1c formed in the first and second regions m1 and m2 draw the oil in the bearing clearance toward the smooth region n, whereby the oil is collected on the smooth region n; therefore, the oil film pressure on the smooth region n is increased. Thus, the effect of formation of lubricating oil film is high. Furthermore, not only the ribs 1d but also the smooth region n provides a support surface to support the shaft; thus, the area of support is increased and the bearing rigidity is high. The ratio r of the axial width of the smooth region n to the bearing width when the latter is taken to be 1 is preferably in the range of r=0.1–0.6, more desirably, r=0.2–0.4. If r is less than 0.1 with respect to the bearing width of 1, the effect to be obtained by reason of the provision of the smooth region n (improved hydrodynamic action, and increased bearing rigidity) fails to manifest itself, whereas if it is greater than 0.6 with respect to the bearing width of 1, the regions where the hydrodynamic pressure generating grooves 1c are formed are decreased, exhibiting less force which urges the oil to the axial central region, thus failing to develop the hydrodynamic effect. In addition, the hydrodynamic pressure generating grooves 1c are shown by way of example in a herringbone form; however, they may be in any form so long as they are inclined with respect to the axis. For example, they may be in a spiral form.

Figure 3:
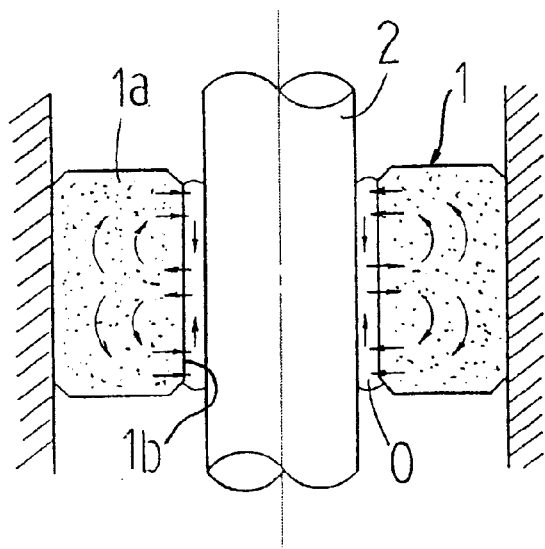
FIG. 3 is a view schematically showing the flow of oil in the axial section when a shaft is supported in a non-contact manner by the hydrodynamic type porous oil-impregnated bearing.

FIG. 3 shows the flow of oil 0 in the axial section when the shaft 2 is supported by the porous oil-impregnated bearing 1 of the above mentioned construction. With the rotation of the shaft 2, the oil 0 retained in the pores of the bearing body 1a exudes from the axial opposite sides of the bearing surface 1b (and the chamfers) into the bearing clearance, and is drawn toward the axial center of the bearing clearance by the hydrodynamic pressure generating grooves. The pressure of luburicating oil film present in the bearing clearance is increased by such action of drawing the oil 0 (the hydrodynamic action). The luburicating oil film formed in the bearing clearance supports the shaft 2 in a non-contact manner with respect to the bearing surface 1b without producing unstable vibrations such as whirl. The oil 0 exuding to flow into the bearing clearance flows back into the bearing body 1a through the surface openings on the bearing surface 1b under the pressure produced with the rotation of the shaft 2, then circulating in the interior of the bearing body 1a, again exuding to flow into the bearing clearance through the surface openings on the bearing surface 1b (and the chamfers). Generally, since it is difficult to make uniform the distribution of the surface openings on the bearing surface, large and small surface openings are present on the bearing surface. Therefore, the amount of oil which returns to the interior of the bearing body differs from place to place. As a result, in the place where oil escapes with ease, oil films hardly form, whereas in the place where oil hardly escapes, oil films form with ease, resulting in the oil film in the bearing clearance having a nonuniform distribution, making it sometimes impossible to obtain a stabilized hydrodynamic effect. In this connection, the porous oil-impregnated bearing 1 of this embodiment has the annular smooth region n between the first and second regions m1 and m2, and in the smooth region n, the distribution of the surface openings is easier to uniformly control. Further, in the first and second regions m1 and m2 the flow of oil in the direction of the grooves is dominant, while in the smooth region n there is a circumferential flow of oil, so that even if there are large surface openings, oil is successively supplied and hence the rate at which the formation of oil films is reduced is much lower.

Figure 4:
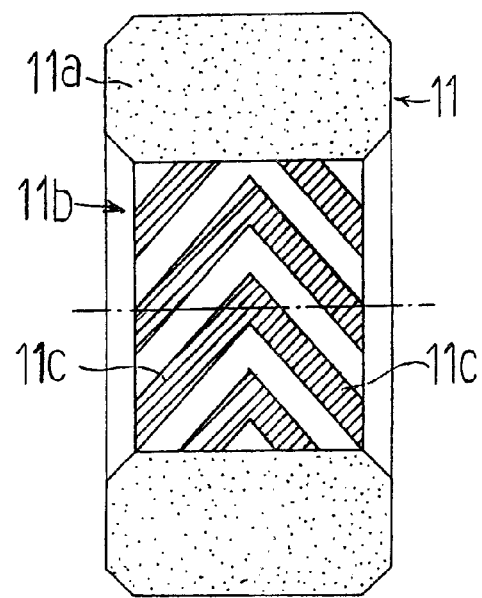
FIG. 4 is a longitudinal sectional view showing another embodiment comparative of a hydrodynamic type porous oil-impregnated bearing.

The hydrodynamic type porous oil-impregnated bearing 11 shown in FIG. 4 has a bearing surface 11b being different from the bearing surface 1b of the above mentioned embodiment in shape. The bearing surface 11b has a first region in which a plurality of hydrodynamic pressure generating grooves 11c inclined in one direction with respect to the axial direction are circumferentially disposed, a second region which is axially continuous to the first region and in which a plurality of hydrodynamic pressure generating grooves 11c inclined in the other direction with respect to the axial direction are circumferentially disposed. The surface openings are distributed on the entire region of the bearing surface 11b including regions of the hydrodynamic pressure generating grooves 11c. Under a condition in which there is a little imbalance of a rotary body so that the bearing rigidity is not required as a impotant characteristic of a bearing, a bearing surface which has axially continuous hydrodynamic pressure generating grooves, such as the above bearing surface 11b, is preferable according to circumstances.

Figure 2:
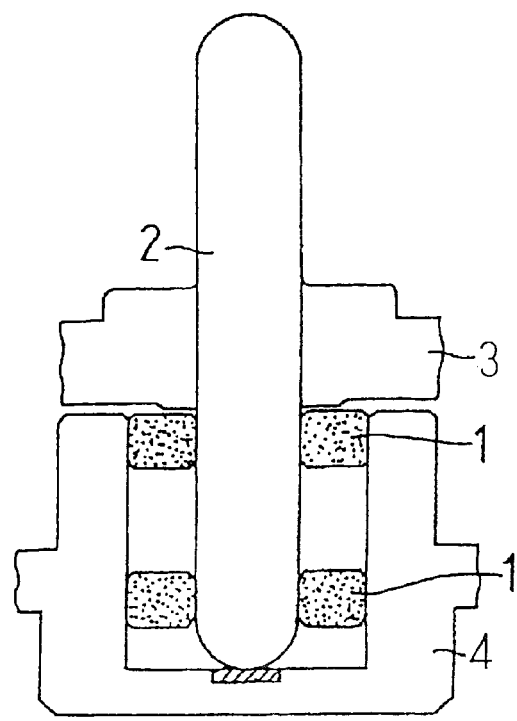
FIG. 2 is a longitudinal sectional view conceptually showing a motor having the hydrodynamic type porous oil-impregnated bearing of the embodiment.
Figure 5:
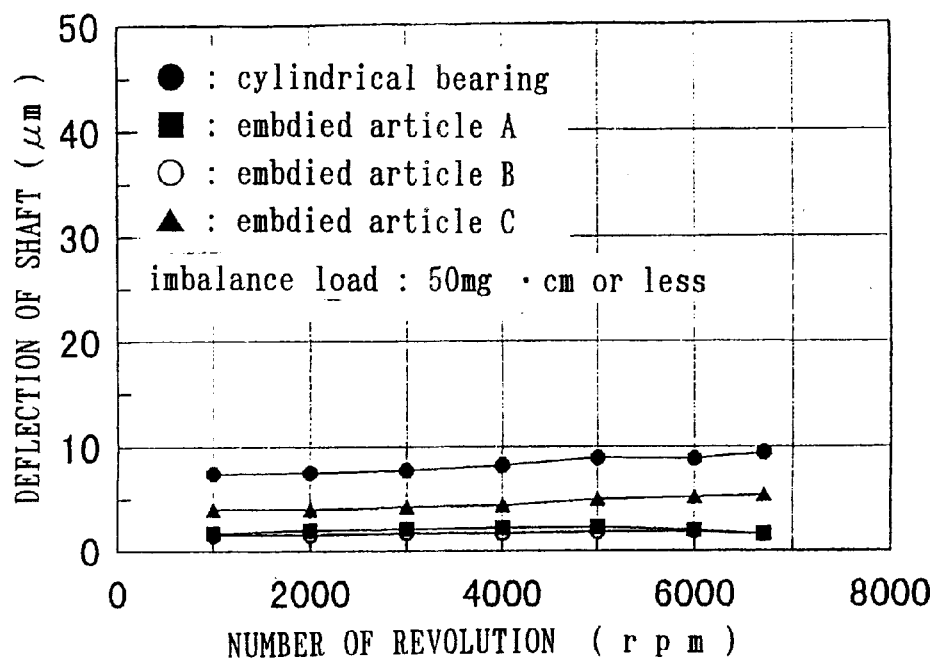
FIG. 5 is a graph showing the results of comparative tests on shaft deflection when the embodied articles and the comparative article are used (in the case where the amount of imbalance is small)
Figure 6:
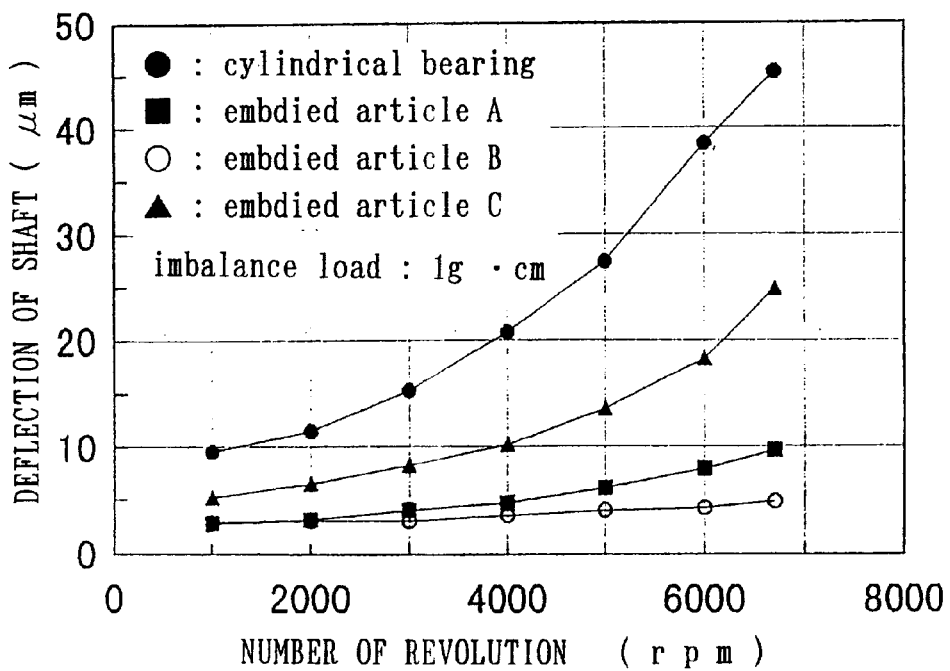
FIG. 6 is a graph showing the results of comparative tests on shaft deflection when the embodied articles and the comparative article are used (in the case where the amount of imbalance is large)

Various test bearings were incorporated into a small-sized spindle motor as shown in FIG. 2 and tested for shaft deflection. The results are shown in FIGS. 5 and 6. FIG. 5 shows the results obtained when almost no imbalance load is applied (imbalance load: 50 mg·cm or less), and FIG. 6 shows the results obtained when large imbalance load is applied (imbalance load: 1 g·cm). As for the test bearings, use was made of embodied articles A(■) and B(○) of the arrangement shown in FIG. 1, C(▼) of the arrangement shown in FIG. 4, and a cylindrical bearing (a porous oil-impregnated bearing having no hydrodynamic pressure generating grooves formed in the bearing surface: (●). The specifications of the test bearings are as follows. The size of the cylindrical bearing (▼), the size of the bearing clearance and other specifications than the shape of the bearing surface are the same as the embodied articles.

[Embodied Article A:■]

Size:inner dia. $\phi$3×outer dia. $\phi$6×width 3 mm

Bearing clearance: 4 $\mu$m

Percentage of area of surface openings on bearing surface: 20%

Specifications of hydrodynamic pressure generating grooves

Groove depth: 3 μm

Number of grooves: 8 for first region, 8 for second region

Angle of inclination of grooves: 20 degrees

Ratio of width of grooves to width of ribs: 1

Width of bearing surface: 2.4 mm (with 0.3 mm chamfers on both sides)

Width of first and second regions: 0.9 mm

Width of smooth region: 0.6 mm

[Embodied article B: ○]

Size:inner dia. φ3×outer dia. φ6×width 3 mm

Bearing clearance: 4 μm

Percentage of area of surface openings on bearing surface: 20% for first and second regions, 10% for smooth region Specifications of hydrodynamic pressure generating grooves Groove depth: 3 μm Number of grooves: 8 for first region, 8 for second region Angle of inclination of grooves: 20 degrees Ratio of width of grooves to width of ribs: 1

Width of bearing surface: 2.4 mm (with 0.3 mm chamfers on both sides)

Width of first and second regions: 0.9 mm

Width of smooth region: 0.6 mm

[Embodied Article C: ▼]

Size: inner dia. φ3×outer dia. φ6×width 3 mm

Bearing clearance: 4 μm

Percentage of area of surface openings in bearing surface: 20%

Specifications of hydrodynamic pressure generating grooves

Groove depth: 3 μm

Number of grooves: 8

Angle of inclination of grooves: 20 degrees

Ratio of width of grooves to width of ribs: 1

Width of bearing surface: 2.4 mm (with 0.3 mm chamfers on both sides)

The embodied article C(▼) produced less shaft deflection than the cylindrical bearing (●) but more shaft deflection than the embodied articles A, B(■, ○), and particularly in the region of higher imbalance load and higher rpm, it produced a large increment in shaft deflection.

The embodied articles A, B(■, ○) produced less shaft deflection irrespective of the size of the imbalance load, and particularly in the region of higher rpm, they produced only a slight increment in shaft deflection. Therefore, the embodied articles A, B(■, ○) can minimize shaft deflection not only for those devices which are subjected to low imbalance load, such as LBP motors but also for those devices which are subjected to high imbalance load when a disk is mounted thereon, such as DVD-ROM motors.

Figure 7:
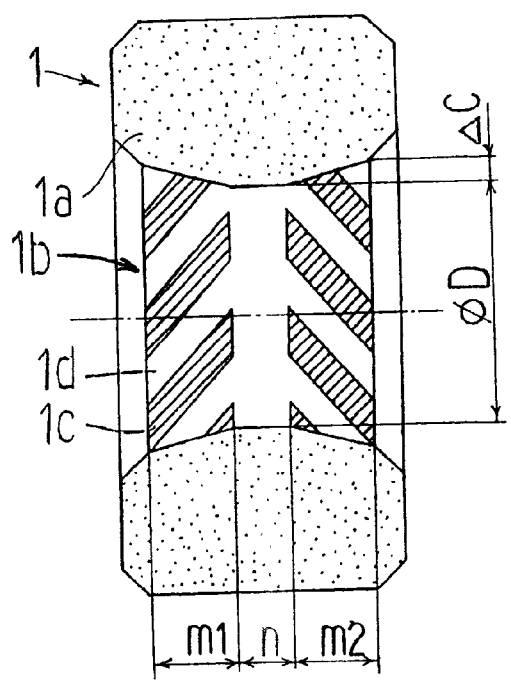
FIG. 7 is a longitudinal sectional view showing another embodiment of a hydrodynamic type porous oil-impregnated bearing.
Figure 8:
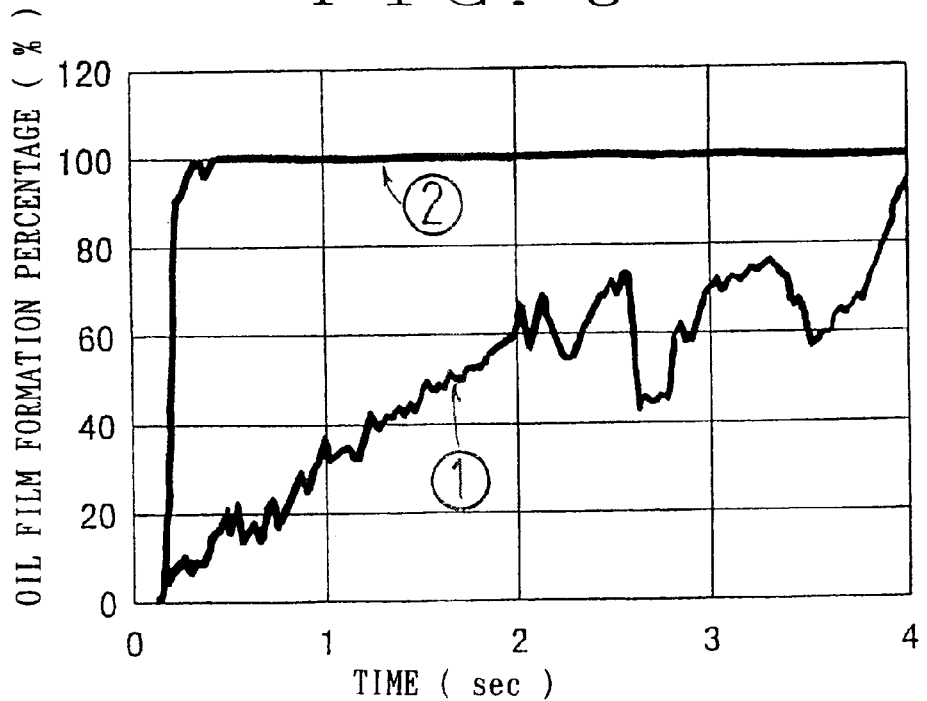
FIG. 8 is a graph showing the results of comparative tests on the oil film forming state at the start of rotation when the embodied article and the comparative article are used.

Next, as shown in FIG. 7, a bearing (an embodied article ②) in which the axial opposite sides of the bearing surface 1b are tapered such that the inner diameter was increased toward the bearing ends and the cylindrical bearing (①) are tested to find the frequency of contact with the shaft at the start of rotation on the basis of the oil film-formation percentage. The results are shown in FIG. 8. In addition, the rpm of the shaft was 6,000.

In the case of the cyrindrical bearing (①), since its oil film formation percentage at the start of rotation was low, its frequency of contact with the shaft was high. The reason is that immediately after the start of rotation, the oil in the bearing clearance is not affluent and the shaft precesses (swings), so that at the sides of the bearing surface, the shaft and the bearing edgewise abut against each other, thus occasioning contact. In contrast, the embodied article (②) had undergone no contact with the shaft since the rotation started and instead an oil film was instantly formed therein. The reason is that since the axial opposite sides of the bearing surface 1b are tapered, the edgewise abutment between the shaft and bearing is avoided.

Figure 9:
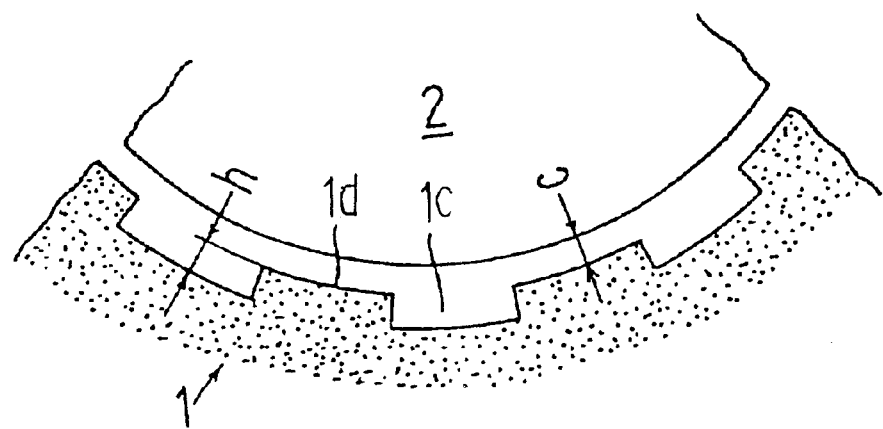
FIG. 9 is a fragmentary enlarged cross sectional view of the hydrodynamic type porous oil-impregnated bearing.

In addition, there is an optimum range in the ratio of the hydrodynamic pressure generating groove depth to the radial clearance, outside which range the hydrodynamic effect is greatly reduced. If c/h is in the range of 0.5–5.0 (see FIG. 9), a high rotation accuracy which causes no problems in practice can be maintained.

Figure 10:
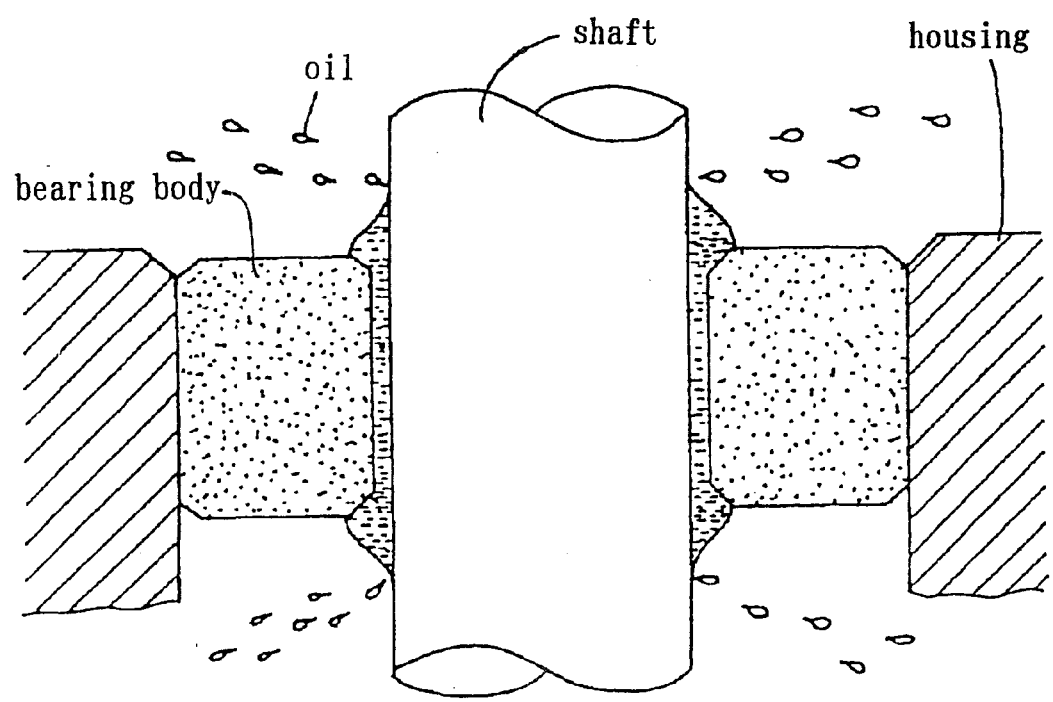
FIG. 10 is a longitudinal sectional view schematically showing how the oil is spattered when a shaft is supported in a non-contact manner by the hydrodynamic type porous oil-impregnated bearing.

Further, although porous oil-impregnated bearings are usually used without being fed with oil, gradual exhaustion or outflow of the internally retained oil due to spattering and evaporation of the oil cannot be avoided. When the oil has been exhausted, the range of oil film formation decreases, leading to degradation of the rotation accuracy, such as shaft deflection. Particularly, a shaft is used often in its vertical position, as shown in FIG. 10, and in the case of a laser beam printer motor which is used at a high speed of 10,000 rpm, the oil retained internally of the bearing tends to flow out under the action of centrifugal force, so that it has been difficult to maintain the performance, such as the formation of oil films. In the case of LB and HDD, discontinuation of oil films is fatal to the maintenance of high rotation accuracy. In the case of a single porous oil-impregnated bearing, particularly when the shaft is rotated at high speed, the oil, taking in the ambient air, is circulated in the bearing, sometimes resulting in the air migrating into the bearing clearance. To prevent the migration of air, it is effective to place an oil re-feeding member in close contact with the bearing body, so as to re-feed oil from the oil re-feeding member as soon as even very few empty pores are created. Placement of an oil re-feeding member brings about not only the effect of prolonging life but also the effect of maintaining an oil film which is necessary for maintaining high accuracy. The oil re-feeding member used in close contact with the bearing body may be in the known form of a porous body, such as metal or resin, or a fibrous material, such as felt, impregnated with oil, but it is preferable to use a solid lubricating composition which has the nature of gradually continuously exuding the internally retained oil to the surface at temperatures of at least 20C. It is recommendable to use, e.g., a solid resin lubricating composition prepared by melting a mixture of lubricating oil or lubricating grease and superhigh molecular weight polyethylene powder, and cooling the melt to solidify the latter. This solid resin lubricating composition continuously exudes the retained oil at not less than ordinary temperatures, making it possible to continuously re-feed oil to the bearing. Further, this solid resin lubricating composition can be mass-produced at low cost and is easy to handle.

Thus, if a solid resin lubricating composition which gradually continuously exudes oil to the surface even when left to stand at not less than ordinary temperatures is placed in close contact with the surface of the bearing, then even if the oil in the bearing flows away, oil is re-fed into the interior of the bearing by the capillary action which occurs in the pores of the bearing body, so that a satisfactory hydrodynamic oil film can be formed at all times. This solid resin lubricating composition can be produced by the following method.

For example, it is obtained by uniformly mixing a predetermined amount of lubricating grease or lubricating oil with a predetermined amount of superhigh molecular weight polyolefin powder, pouring the mixture into a die of predetermined shape, and melting the mixture at temperatures not less than the gelling temperature of the superhigh molecular weight polyolefin powder and not more than the dropping point of lubricating grease if such grease is used, and cooling the mixture at ordinary temperatures. The superhigh molecular weight polyolefin powder may be a powder of polyethylene, polypropylene, or polybutene or a copolymer thereof, or a mixture of these powders, the molecular weight of each powder being so selected that the average molecular weight measured by the viscosity method is $1\times10^6$–$5\times10^6$. Polyolefins which are within the range of such average molecular weight are superior to low molecular weight polyolefins in rigidity and oil retention and will hardly flow even heated to high temperatures. The proportion of such superhigh molecular weight polyolefin in the lubricating composition is 95–1 wt %, and the amount depends on the desired degree of bleeding, toughness and hardness of the composition. Therefore, the greater the amount of superhigh molecular weight polyolefin, the higher the hardness of the gel after dispersion at a predetermined temperature.

Further, the lubricating grease used in this invention is not particularly restricted, and may be a soap-thickened or non-soap-thickened lubricating grease, examples of such lubricating grease being lithium soap-diester type, lithium soap-mineral oil type, sodium soap-mineral oil type, aluminum soap-mineral oil type, lithium soap-diester mineral oil type, non-soap-diester type, non-soap-mineral oil type, non-soap-polyester type, and lithium soap-polyolester type. The lubricating oil is not particularly restricted, either, examples thereof being diester type, mineral oil type, diester mineral oil type, polyolester type, and polyaolefin type. In addition, the base oil for the lubricating grease or the lubricating oil is desirably the same lubricating oil as that with which the porous oil-impregnated bearing is initially impregnated, but it may be more or less different therefrom so long as the lubricating characteristics are not impaired.

Although the melting points of the superhigh molecular weight polyolefins mentioned above are not constant as they vary according to their respective average molecular weights, one, e.g., having an average molecular weight of $2\times10^6$ as measured by the viscosity method has a melting point of 136° C. As for a commercially available one having the same average molecular weight, there is Mipelon (registered trade mark) XM-220, produced by Mitsui Petrochemical Industries, Ltd., and the like.

Therefore, when it is desired to disperse superhigh molecular weight polyolefin in the aforesaid lubricating grease or lubricating oil and retain it therein, said materials, after being mixed, are heated to a temperature not less than the gelling temperature of the superhigh molecular weight polyolefin and if lubricating grease is used, to a temperature less than the dropping point thereof, e.g., to 150–200° C.

Such bearing device can be widely utilized, for example, in various motors, including laser beam printer polygon mirror motors, magnetic disk drive spindle motors, and DVD-ROM motors, and motors for axial fans, ventilating fans, electric fans and other electric appliances, electric parts for cars, etc, and their durability can be greatly improved by hydrodynamically supporting the shaft.

Figure 11:
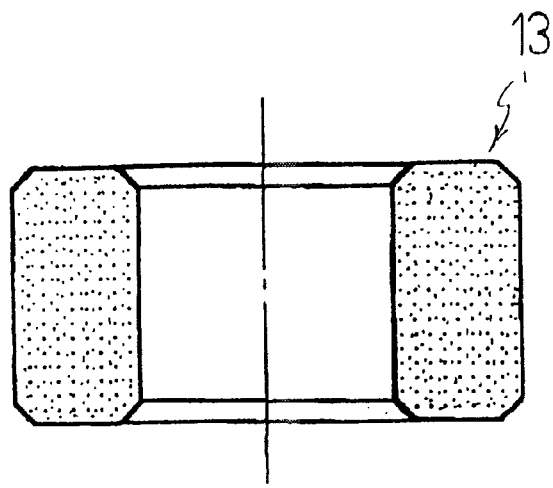
FIG. 11 is a longitudinal sectional view showing a sintered metal blank to be used in an embodiment of the production method.

The bearing body 1a of the porous oil-impregnated bearing 1 shown in FIG. 1 can be produced by compacting a metal powder material contains copper or iron, or both as a main component, sintering it to obtain a cylindrical sintered metal blank 13 shown in FIG. 11, and subjecting said blank to sizing→rotation sizing→bearing surface forming.

The sizing process is a process for sizing the outer and inner peripheral surfaces of the sintered metal blank 13, which is performed by press-fitting the outer peripheral surface of the sintered metal blank 13 in a cylindrical die while press-fitting a sizing pin in the inner peripheral surface. The rotation sizing process is a process in which a polygonal sizing pin is press-fitted in the inner peripheral surface of the sintered metal blank 13 and then the inner peripheral surface is sized while the sizing pin is rotated. The bearing surface forming process is a process in which a forming pattern having a shape corresponding to the bearing surface 1b of a finished product 1a is pressed against the inner peripheral surface of the sintered metal blank 13 having said sizing treatment applied thereto to thereby simultaneously form a region of hydrodynamic pressure generating grooves 1c and the other regions (ribs 1d and annular smooth region n) in the bearing surface 1b. This process is, for example, as follows.

Figure 12A:
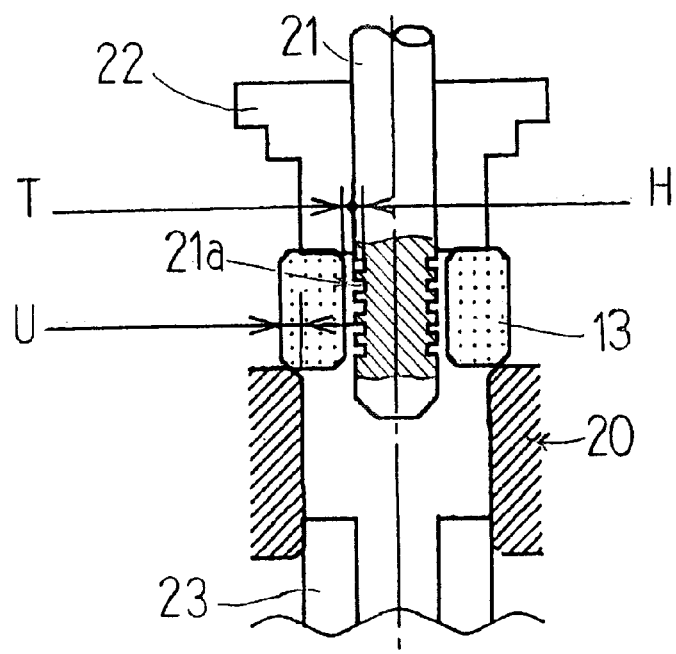
FIG. 12A is a longitudinal sectional view showing the outline of a forming device used for forming a bearing surface.
Figure 12B:
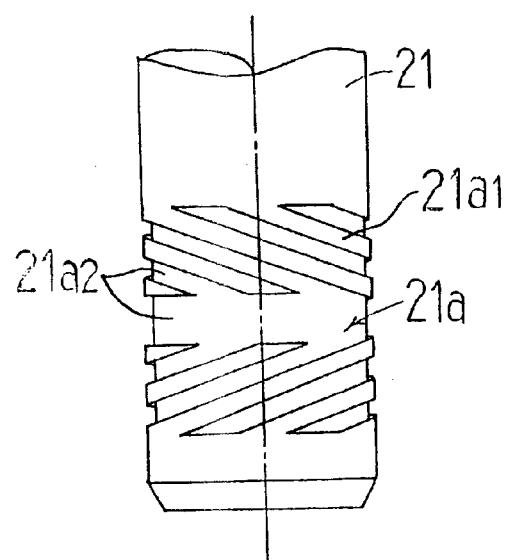
FIG. 12B is a side view showing a die for forming a bearing surface.

FIG. 12A shows by way of example the outline construction of a forming machine used in the bearing surface forming process. This device comprises a cylindrical die 20 in which the outer peripheral surface of the sintered metal blank 13 is to be press-fitted, a core rod 21 for forming the inner peripheral surface of the sintered metal blank 13, and upper and lower punches 22 and 23 for holding the upper and lower end surfaces of the sintered metal blank 13. As shown in FIG. 12B, the outer peripheral surface of the core rod 21 is formed with forming pattern 21a in concave-convex form corresponding to the shape of the bearing surface 1b of a finished product. The convex portion 21a1 of the forming pattern 21a is to form the region of the hydrodynamic pressure generating grooves 1c in the bearing surface 1b, while the concave portion 21a2 is to form the other region (ribs 1d and annular smooth region n) than the region of the hydrodynamic pressure generating grooves 1c in the bearing surface 1b. The level difference (depth H, for example 2–5 $\mu$m) between the convex and concave portions 21a1 and 21a2 of the forming pattern 21a is as deep as the hydrodynamic pressure generating grooves 1c in the bearing surface 1b, but it is shown considerably exaggerated in the figure.

Before the sintered metal blank 13 is press-fitted in the die 20, there is an inner clearance T between the inner peripheral surface of the sintered metal blank 13 and the forming pattern 21a of the core rod 21 (based on the convex portion 21a1). The size (diametrical value) of the inner clearance T is, e.g., 50 $\mu$m. The press-fit allowance (outer interference U: diametrical value) for the outer peripheral surface of the sintered metal blank 13 with respect to the die 20 is, e.g., 150 $\mu$m.

Figure 13:
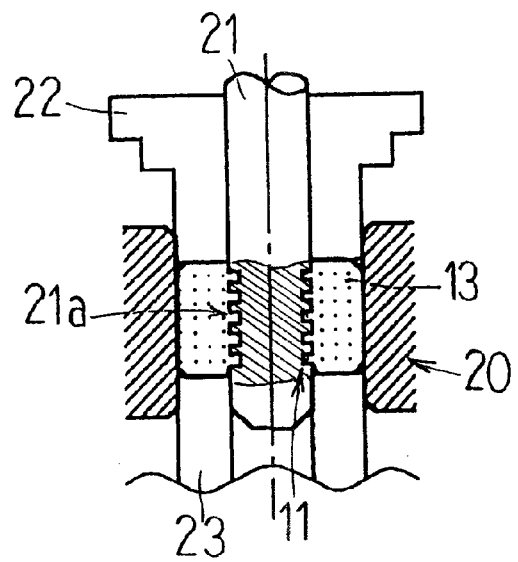

After the sintered metal blank 13 is placed on the die 20 for alignment, as shown in FIG. 13, the upper punch 22 and core rod 21 are lowered to press-fit the sintered metal blank 13 in the die 20 to urge it against the lower punch 23, thereby pressing it from above and below.

The sintered metal blank 13 receives a compacting pressure from the die 20 and upper and lower punches 22, 23 and is thereby deformed, with the inner peripheral surface thereof pressed against the forming pattern 21a of the core rod 21. The amount of compression of the inner peripheral surface of the sintered metal blank 13 is approximately equal to the difference between the outer interference U and the inner clearance T, and the surface layer portion of the sintered metal blank 13 extending from the inner peripheral surface to a predetermined depth is pressed by the forming pattern 21a of the core rod 21, producing a plastic flow which cuts into the forming pattern 21a. Thereby, the shape of the forming pattern 21a is transferred to the inner peripheral surface of the sintered metal blank 13, whereby the bearing surface 1b is formed to have the shape shown in FIG. 1.

Figure 14:
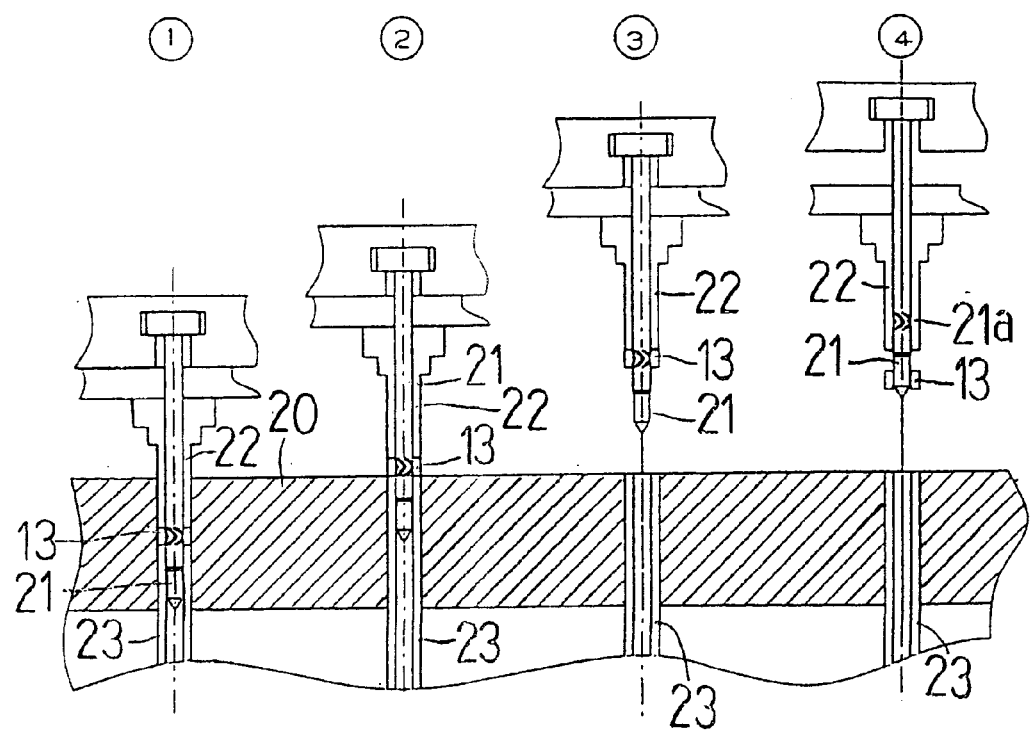
FIGS. 13–15 are views showing the forming steps for a bearing surface.
Figure 15:
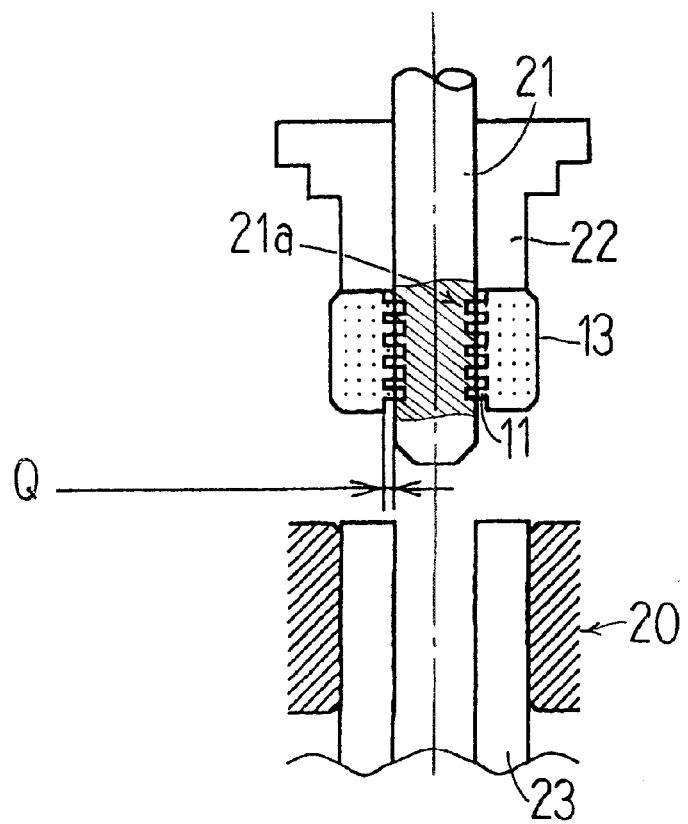

After the forming of the bearing surface 1b is completed, as shown in FIG. 14, with the core rod 21 inserted in the sintered metal blank 13, the lower punch 23 and core rod 21 are operatively lifted (the state of FIG. 14 ②) and the sintered metal blank 13 is extracted from the die 20 (the state of FIG. 14 ①). When the sintered metal blank 13 is extracted from the die 20, an amount of spring-back Q is produced in the sintered metal blank 13 to increase the inner diameter of the latter (see FIG. 15), so that the core rod 21 can be extracted from the inner peripheral surface of the sintered metal blank 13 without breaking the hydrodynamic pressure generating grooves 1c (the state of FIG. 14 ④). This completes the bearing body 1a.

Figure 16:
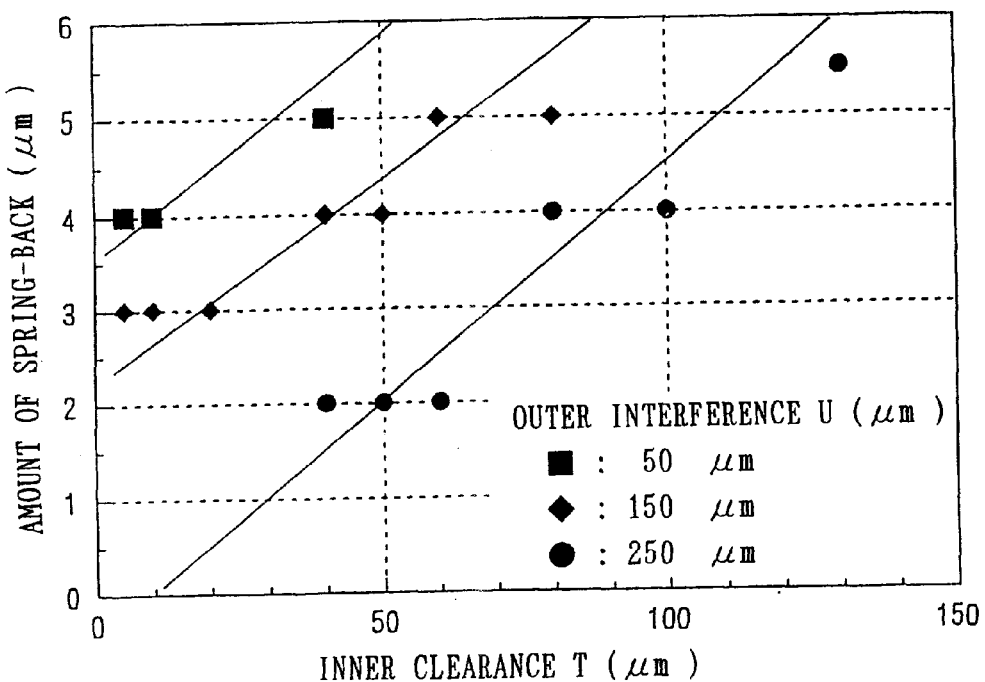
FIG. 16 is a graph showing the relation between the inner clearance and outer interference, and the amount of spring-back.

FIG. 16 shows the relation between the inner clearance T and outer interference U and the amount of spring-back Q when said bearing surface forming process has been performed on a sintered metal blank of inner diameter φ3, outer diameter φ6 and width 3 mm. As shown in this figure there is a certain interrelation between the inner clearance T and outer interference U and the amount of spring-back Q, it being understood that when the inner clearance T and outer interference U are specified, the amount of spring-back Q is specified. According to experiments, it has been found that at a predetermined groove depth H (2–3 μm), if the amount of spring-back Q is set at 4–5 μm (diametrical value), the sintered metal blank 13 can be extracted from the core rod 21 without breaking the hydrodynamic pressure generating grooves 1c; thus, it is advisable to set the inner clearance T and outer interference U in such a manner as to provide the amount of spring-back Q to that degree. In addition, when the radial amount of the spring-back Q of the sintered metal blank 13 is greater than the depth H of the hydrodynamic pressure generating grooves 1c, the forming pattern 21a can be released without interfering with the inner peripheral surface of the sintered metal blank 13. However, even when the radial amount of the spring-back Q of the sintered metal blank 13 is less than the depth H of the hydrodynamic pressure generating grooves 1c and the forming pattern 21a more or less interferes with the inner peripheral surface of the sintered metal blank 13, it may be enough when the forming pattern 21a can be released from the inner peripheral surface of the sintered metal blank 13 without breaking the hydrodynamic pressure generating grooves 1c, with adding an increase in diameter (radial amount) of the sintered metal blank 13 due to the material elasticity of the sintered metal blank 13.

In addition, after the forming process for the bearing surface 1b has been completed, the bearing surface 1b may be sized by using an ordinary sizing pin (of circular cross section). In this case, the ribs 1d and smooth region n in the bearing surface 1b are sized by the sizing pin, whereby the percentage of area of surface openings on their region becomes lower than that of the region of the hydrodynamic pressure generating grooves 1c. Also, such a forming process for the bearing surface may be emploied that comprising the steps of forming only the regin of the hydrodynamic pressure generating grooves by the forming pattern, and then sizing or rotation sizing the other region in the bearing surface.

The bearing body 1a is produced through the processes described above and is impregnated with lubricating oil or lubricating grease to retain oil, whereupon the hydrodynamic type porous oil-impregnated bearing 1 in the form shown in FIG. 1 is completed.

Figure 17:
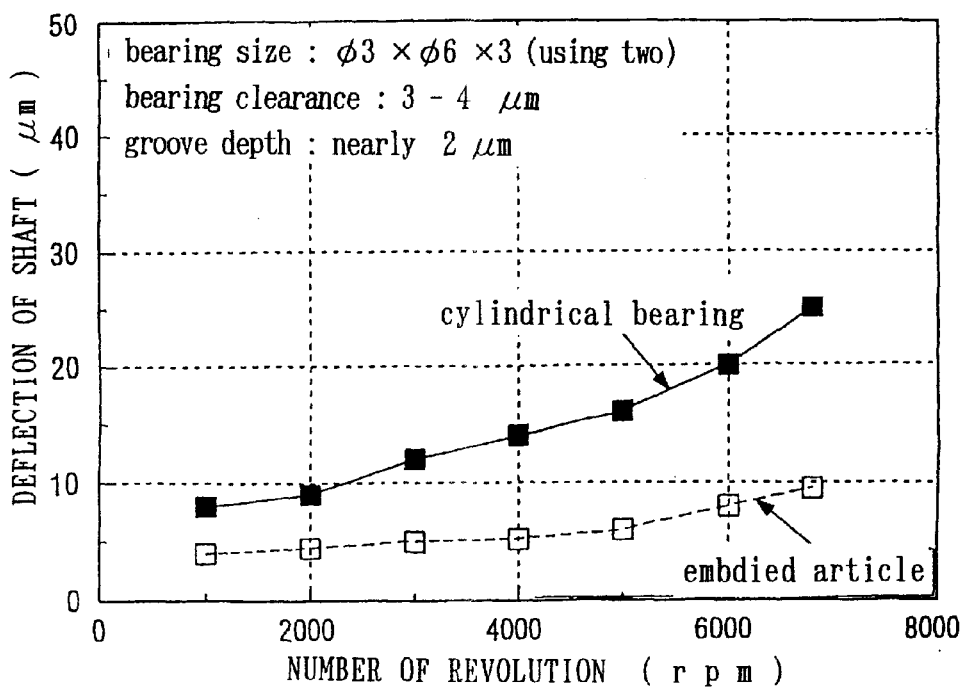
FIG. 17 is a graph showing the results of comparative tests on shaft deflection when a cyrindrical bearing and a hydrodynamic type porous oil-impregnated bearing produced by the production method of the embodiment are used.
Figure 18:
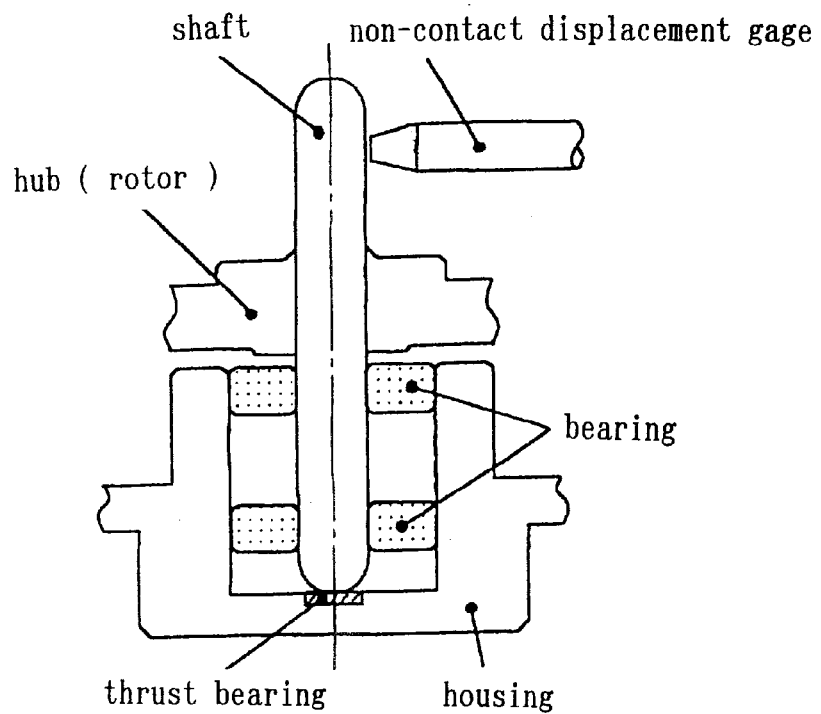
FIG. 18 is a longitudinal sectional view conceptually showing a testing device used for the comparative tests shown in FIG. 17.

Comparative tests for shaft deflection were conducted using cylindrical bearing (a porous oil-impregnated bearings having no hydrodynamic pressure generating grooves formed in the bearing surface) and hydrodynamic type porous oil-impregnated bearings produced by the aforesaid method. The tests were conducted by incorporating test bearings in CD-ROM motors shown in FIG. 18, with a commercially available CD set therein, the shaft deflection relative to rpm was measured. The results are shown in FIG. 17. It is seen from this figure that as compared with cylindrical bearing, the hydrodynamic type porous oil-impregnated bearings of the embodiment are effective in suppressing shaft deflection.

In the above embodiment, the forming process for the bearing surface has been applied to the sintered metal blank 13; however, it may be performed in a compacting process for powder metal material. This compacting process is such a process that comprises the steps of disposing a forming pin in a die, filling the powder metal material between the forming pin and the die, applying a compacting pressure to the powder metal material to form into a cylindrical form. In this compacting process, it is possible to form a bearing surface as shown in FIG. 1 at the same time of compacting a compacted body, by being provided with forming pattern, as shown in FIG. 12B, on the outer peripheral surface of the forming pin. Further, after compaction, the compacted body can be released from the forming pin while utilizing the spring-back of the compacted body due to removal of the compacting pressure, without any possibility of the bearing surface losing its shape. The compacted body is sintered, and then it is finished through sizing, impregnation with oil, etc.

In addition, it is only necessary that the bearing body be porous; thus, it is not limited to said sintered metal but may, e.g., be a porous body formed by foaming. As blanks therefor, cast iron, synthetic resin, ceramics and the like may be used. Further, in the above embodiment, the spring-back of the formed body has been utilized for releasing the forming pattern; however, the forming pattern may be constructed such that it can be elastically decreased in diameter. Thus, after the forming of the bearing surface, the forming pattern may be elastically decreased in diameter to be released from the formed product. Futher, when forming the bearing surface 11b shown in FIG. 4, the forming pattern may be shaped as corresponding to the shape of the bearing surface 11b.

Figure 19:
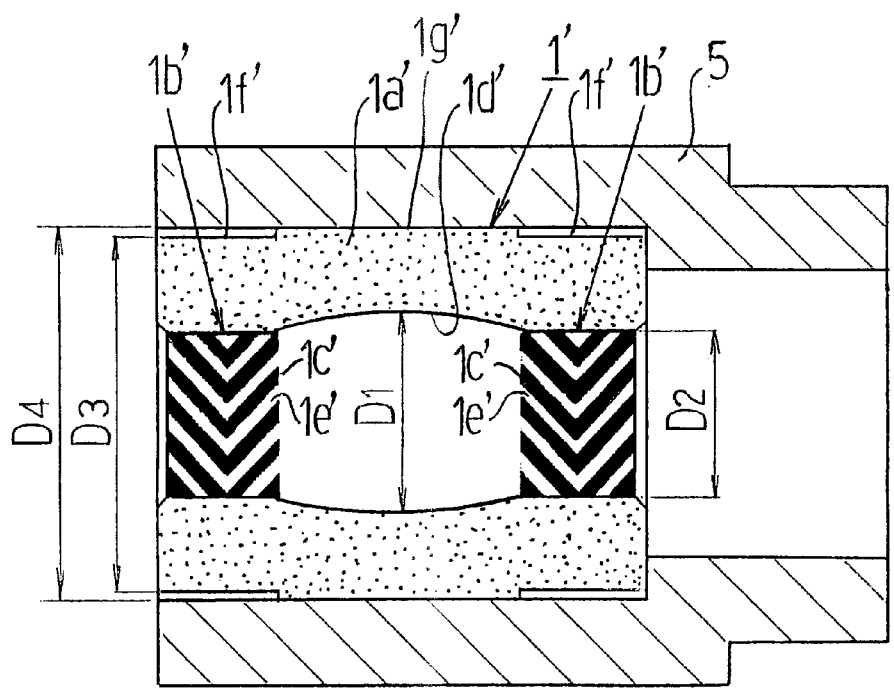
FIG. 19 is a longitudinal sectional view showing an embodiment of a hydrodynamic type porous oil-impregnated bearing having a plurality of bearing surfaces.

FIG. 19 shows the state in which a hydrodynamic type porous oil-impregnated bearing 1' having a plurality of bearing surfaces 1b' is fixed to a housing 5. The porous oil-impregnated bearing 1' comprises a porous body, e.g., a bearing body 1a' of sintered metal containing copper or iron, or both as a main component and oil retained in the pores of the bearing body 1a' by impregnation with lubricating oil or lubricating grease.

The inner peripheral surface of the bearing body 1a' is formed with a plurality of, for example, two, axially spaced bearing surfaces 1b' opposed to an outer peripheral surface of a shaft to be supported, each of the two bearing sufaces 1b' being formed with a plurality of circumferentially disposed hydrodynamic pressure generating grooves 1c'. In the same way as shown in FIG. 4, the hydrodynamic pressure generating grooves 1c' in this embodiment have a V-shaped continuous form having a pair of groove regions, with the grooves in one region inclined in one direction with respect to the axial direction and the grooves in the other region inclined in the other direction with respect to the axial direction. The surface openings are distributed on both regions of the hydrodynamic pressure generating grooves 1c' and ribs 1e' in the bearing surfaces 1b'. In addition, it is sufficient to form the hydrodynamic pressure generating grooves 1c' in at least one of the bearing surfaces 1b'.

The region 1d' between the bearing surfaces 1b' of the bearing body 1a' has an inner diameter D1 which is greater than the inner diameter D2 of the bearing surfaces 1b' {strictly, the inner diameter of the region of the ribs 1e' (corresponding to 1d in FIG. 9) between the hydrodynamic pressure generating grooves 1c' }. In this embodiment, the axial section of the region 1d' is described with a single arc continuous to the bearing surfaces 1b', the largest diameter portion of said arc being located at the axial center of the region 1d'. In addition, level differences may be provided in the boundaries between the region 1d' and the bearing surfaces 1b'. Further, the axial section of the region 1d' may be described with other curves, besides an arc, such as ellipse, parabola, etc. It may be described with a combination of two like curves (for example, two arcs), a combination of two dissimilar curves (for example, an arc and parabola) or a combination of a curve and a straight line. The largest diameter portion of the region 1d' may be deviated to the side associated with one bearing surface 1b'.

Further, in this embodiment, the outer diameter D3 of the outer portions 1f' corresponding to the two bearing surfaces 1b' is smaller than the outer diameter D4 of the outer portion 1g' corresponding to the region 1d' between the bearing surfaces 1b' in the bearing body 1a'. When the porous oil-impregnated bearing 1' is press-fitted in the inner periphery of a housing 5 in the manner shown in the figure, deformation of the bearing surfaces 1b' due to the fitting force can be prevented or mitigated, so that substantial accuracy can be obtained. The fixing force can be obtained through the interference between the outer portion 1g' and the housing 5. The region 1d' is larger in diameter than the bearing surfaces 1b' and does not take part in supporting the shaft, so that even if an amount of deformation corresponding to the fitting force takes place, there is no influence on the accuracy of the bearing. The difference between the outer diameter D3 of the outer portions 1f' and the outer diameter D4 of the outer portion 1g' (the difference before press-fitting) is determined such that in consideration of the interference with the housing 5 (the interference of the outer portion 1g'), the outer portion 1f' does not contact the inner periphery of the housing 5 or provides an amount of interference which does not influence the bearing accuracy. In addition, the outer diameter of only one of the two outer portions 1f' may be determined in the manner described above.

Figure 20:
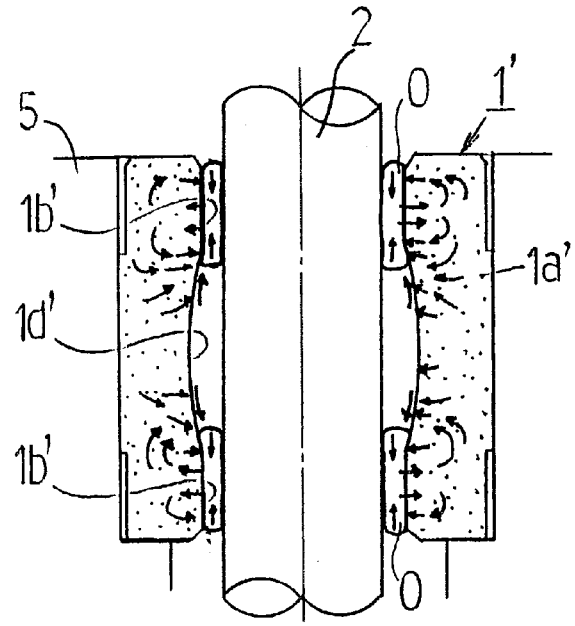
FIG. 20 is a view schematically showing the flow of oil in the axial section when a shaft is supported in a non-contact manner by the hydrodynamic type porous oil-impregnated bearing shown in FIG. 19.

FIG. 20 shows the flow of oil in an axial section when the shaft 2 is supported by the porous oil-impregnated bearing 1' arranged in the manner described above. As the shaft 2 is rotated, the oil 0 retained in the bearing body 1a' exudes from the axial opposite sides of each bearing surface 1b' to enter the bearing clearance and then it is drawn to the axial center of the bearing clearance by the hydrodynamic pressure generating grooves. The action of drawing the oil 0 (hydrodynamic action) increases the pressure of the oil film present in the bearing clearance, thus forming a lubricating oil film. This lubricating oil film formed in the bearing clearance supports the shaft 2 in a non-contact manner with respect to the bearing surfaces 1b' without causing unstable vibrations such as whirl. The oil 0 exuding into the bearing clearance returns to the interior of the bearing body 1a' through the surface openings in the bearing surfaces 1b' under the action of the generated pressure which accompanies the rotation of the shaft 2, the oil circulating in the interior of the bearing body 1a' and again exuding into the bearing clearance through the bearing surfaces 1b'. In this way, the oil 0 retained in the bearing body 1a' continuously supports the shaft 2 in a non-contact manner by the hydrodynamic effect while circulating between the bearing clearance and the bearing body 1a'.

Since this porous oil-impregnated bearing 1' supports the shaft 2 in a non-contact manner by the two axially spaced bearing surfaces 1b', the shaft 2 can be accurately supported by one bearing. Further, the drawing action of the hydrodynamic pressure generating grooves 1c' produces a negative pressure in the space defined between the region 1d' between the bearing surfaces 1b' and the outer peripheral surface of the shaft 2 and the oil 0 exudes also from the surface openings on the region 1d' and is fed to the bearing surfaces 1b', thereby enhancing the formation of lubricating oil film in the bearing clearance and increasing the bearing rigidity. Particularly, in the case where the axial section of the region 1d' is described with an arc (or other curve) continuous to the bearing surfaces 1b' as in this embodiment, the oil 0 exuding from the surface openings on the region 1d' flows axially along the region 1d' until it is effectively fed to the bearing surfaces 1b', a fact which leads to the effective use of oil and the enhancement of formation of lubricating oil film.

In order to keep such circulation of oil satisfactory, it is desirable that the surface openings be substantially uniformly distributed on both regions of the hydrodynamic pressure generating grooves 1c' and ribs 1e' in the bearing surfaces 1b'. If the proportion of the surface openings (the percentage of area of surface openings) in the surface is decreased, the oil becomes less mobile and reversely if it is increased, the oil becomes more mobile. Further, the viscosity of oil is related to the mobility of oil such that if the viscosity is low, the mobility is high and if it is high, the mobility is low.

If the percentage of area of surface openings is high and the viscosity is low, the oil becomes extremely mobile but the oil exuded into the bearing clearance is readily returned to the interior of the bearing body by the action of the hydrodynamic pressure generating grooves, thereby decreasing the hydrodynamic effect. Reversely, if the percentage of area of surface openings is low and the viscosity is high, the oil becomes extremely immobile, so that, though the pressure of the lubricating oil film increases, the proper circulation of oil is impeded and the degradation of oil is accelerated.

Therefore, there is an optimum range between the percentage of area of surface openings and the viscosity of oil which secures the formation of lubricating oil film necessary for supporting the shaft in a non-contact manner and which also secures the appropriate circulation of oil.

Figure 21:
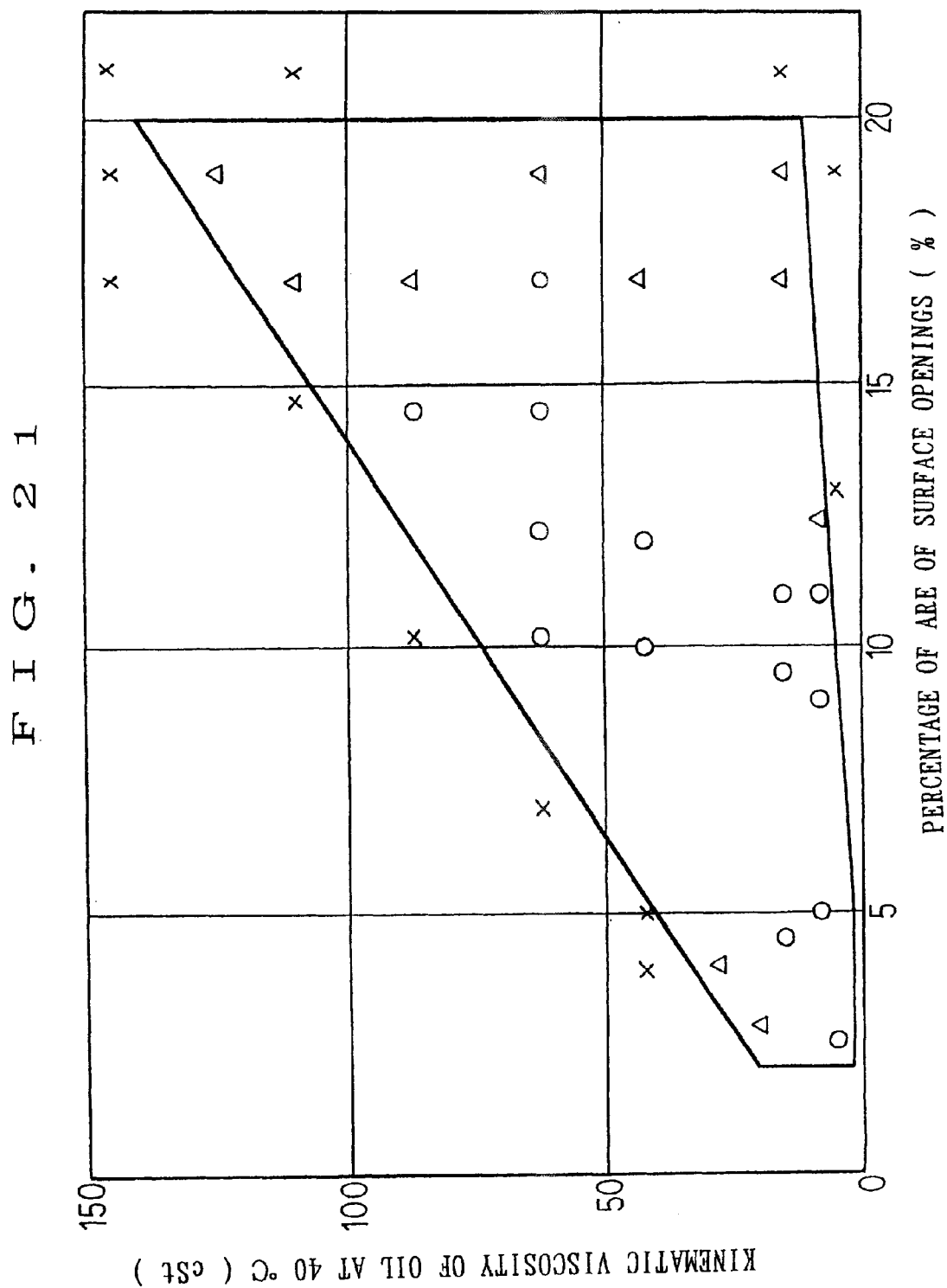
FIG. 21 is a graph showing the relation between the percentage of area of surface openings on the bearing surface and the kinematic viscosity of oil.

To clarify this optimum range, evaluation tests were conducted by using LBP motors. The LBP motors used in the evaluation tests had a shaft diameter of $\phi 4$ and a mirror installed therein, the rpm being 10,000, the surrounding temperature being 40° C. The results are shown in FIG. 21. In this figure, "○" indicates the absence of problems in 1,000-hour continuous running endurance test. And "Δ" indicates that troubles occurred, during 500–1,000 hours, such as an increase in shaft deflection (5 $\mu$m or above), an increase in torque=a decrease in rpm (the rpm failed to increase to 10,000 rpm) and abnormal sound and that normal operation was impossible. The mark "X" indicates that such troubles occurred within 500–1,000 hours.

It is seen from the above evaluation tests that the optimum range of the percentage of area of surface openings and the oil viscosity (the region where there is no "X") is the area surrounded by solid line in FIG. 21, which area satisfies the following conditions:

a) The percentage of area of sufade openings on the bearing surface including the region of the hydrodynamic pressure generating grooves is not less than 2% but not more than 20%;

b) The kinematic viscosity of retained oil at 40° C. is not less than 2 cSt;

c) The percentage of area of surface openings on the bearing surface and the kinematic viscosity of oil at 40° C. satisfy the relation $$(3/5)A-1 \leq \eta \leq (40/6)A+(20/3)$$

where A; percentage of area of surface openings [%]

η; kinematic viscosity of oil at 40° C. [cSt]

Selecting the percentage of area of surface openings and the oil viscosity within such range ensures formation of a sufficient lubricating oil film to support the shaft in a non-contact manner and its proper circulation, so that high rotation accuracy and long life can be attained.

There is an optimum range of ratio of the depth (h) of the hydrodynamic pressure generating grooves to the size of the bearing clearance (radial clearance: c) and it is believed that with values outside the range, the sufficient hydrodynamic effect cannot be obtained. To clarify this optimum range, evaluation tests were conducted by replacing the shaft of the LBP motor by a longer one to allow measurement of shaft deflection. The rpm was 10,000 and the test ambient atmosphere was at ordinary temperatures and humidity, and the LBP motor was φ4, and did not have a mirror installed therein. In addition, the shaft defection was measured with a non-contact type displacement gauge.

Figure 22:
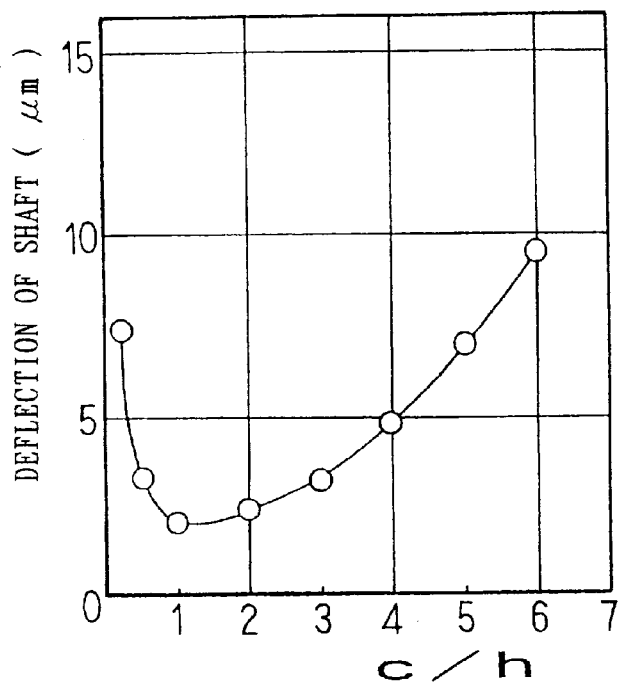
FIGS. 22 and 24 are graphs showing the results of evaluation tests on shaft deflection.

Under the above conditions, values of the shaft deflection relative to the c/h (c; radial clearance, h; groove depth) were plotted, and the results shown in FIG. 22 were obtained. It is seen from FIG. 22 that when the c/h is in the range of 0.5–4.0, then the shaft deflection is not more than 5 μm, but if it is less than 0.5 or greater than 4.0, then the shaft deflection is not less than 5 μm. Therefore, to maintain high accuracy, it is desirable that the c/h be in the range of 0.5–4.0. In addition, it is desirable that the size c of the bearing clearance (radial clearance) be such that when the radius of the shaft is R, then the c/R is in the range of 1/2,000–1/400.

Figure 23:
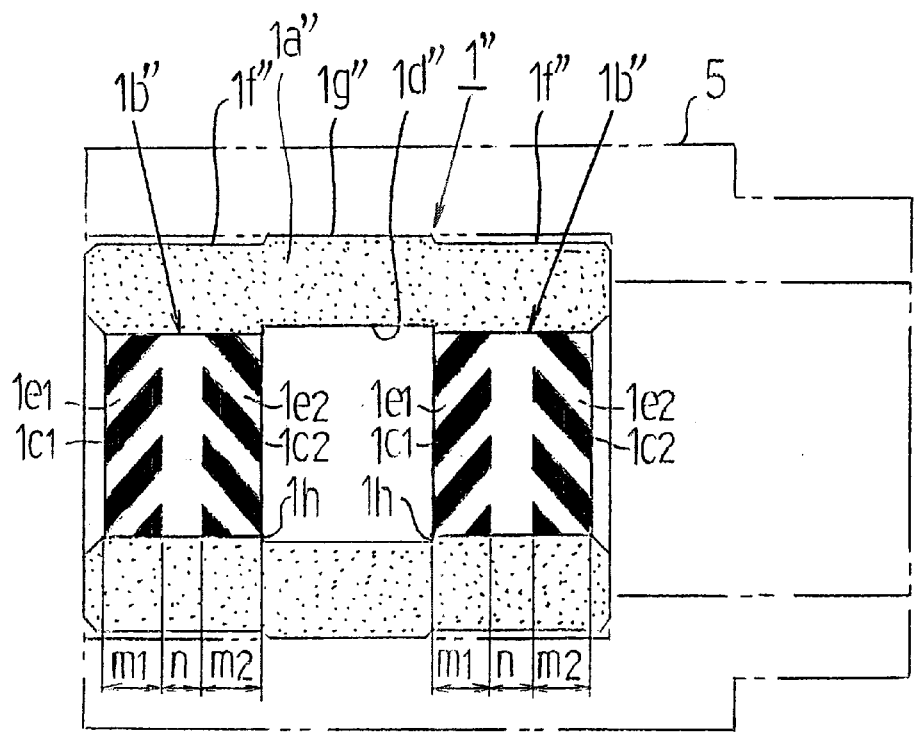
FIG. 23 is a longitudinal sectional view showing another embodiment of a hydrodynamic type porous oil-impregnated bearing having a plurality of bearing surfaces.

A hydrodynamic type porous oil-impregnated bearing 1" shown in FIG. 23 also has a plurality of bearing surfaces; however, the shape of the bearing surfaces differs from that of the hydrodynamic type porous oil-impregnated bearing 1' shown in FIG. 19.

Each of the bearing surfaces 1l" of the porous oil-impregnated bearing 1" in this embodiment comprises a first region m1 in which a plurality of hydrodynamic pressure generating grooves 1c1 inclined in one direction with respect to the axial direction are circumferentially disposed, a second region m2 which is axially spaced from said first region m1 and in which a plurality of hydrodynamic pressure generating grooves 1c2 inclined in the other direction with respect to the axial direction are circumferentially disposed, and an annular smooth region n disposed between the first and second regions m1 and m2. The ribs 1e1 of the first region m1 and the ribs 1e2 of the second region m2 continuous to the smooth region n. When a relative rotation is produced between the bearing body 1a" and the shaft, the hydrodynamic pressure generating grooves 1c1 and 1c2 formed in the first and second regions m1 and m2 in a mutually reversely inclined manner draw oil into the smooth region n to collect the oil in the smooth region n, whereby the oil film pressure in the smooth region n is increased. Furthermore, since the smooth region n has no grooves formed therein, the effect of formation of lubricating oil film in this region is high, and in addition to the ribs 1e1 and 1e2, the smooth region n provides a support surface for supporting the shaft, whereby the support area is increased and so is the bearing rigidity. Further, the axial section of the region 1d" between the bearing surfaces 1b" is described with an axial straight line, and the boundaries between the region 1d" and the bearing surfaces 1b" form level differences 1h. In addition, the axial section of the region 1d" may be described with a combination of two straight lines inclined with respect to the axial direction (V-shaped type).

In addition, as in the case of the hydrodynamic type porous oil-impregnated bearing 1' shown in FIG. 19, the inner diameter of the region 1d" is greater than that of the bearing surfaces 1b", and the outer diameter of the outer portions 1f" corresponding to the bearing surfaces 1b" is smaller than that of the outer portion 1g" corresponding to the region 1d".

Comparative tests on press-fitting in a housing and rotation accuracy comparative tests were conducted. The results are described below.

(1) Comparative tests on Press-fitting in Housing

Comparative article: Constructed such that it has a single bearing surface having hydrodynamic pressure generating grooves formed therein. Two test bearings were produced, whose inner diameter before press-fitting was φ3.006, and they were press-fitted in a housing with an interference of 18 μm, the correcting pin diameter being φ3.000 mm.

Embodied article: Constructed such that it has two bearing surface each having hydrodynamic pressure generating grooves formed therein. The test bearing was press-fitted in a housing under the same conditions as above.

Test results: In the case of the comparative article, the two bearings had part of their hydrodynamic pressure generating grooves collapsed. The tests were conducted with the bearings installed in motors, and the rotation was unstable, producing a shaft deflection and the like which are worse than in the case of ordinary cyrindrical bearings (bearings which have no hydrodynamic pressure generating grooves formed in their bearing surfaces). The cause of collapse of part of the hydrodynamic pressure generating grooves seems to be the local thickening of material in the test bearings (same with bearing products); therefore, it is believed that the correcting force from the correcting pin acted heavily on part of the hydrodynamic pressure generating grooves. In contrast thereto, in the embodied article, although the groove depth was found decreased as a whole (from 4 μm to 3.5 μm), there was observed no phenomenon in which part thereof was collapsed. When the bearing was installed in a motor and the shaft deflection was measured, it exhibited an excellent performance; the shaft deflection was not more than 2 μm at 2,000–15,000 rpm.

(2) Rotation Accuracy Comparative Tests

Comparative article: Constructed such that it has two bearing surfaces each having no hydrodynamic pressure generating grooves formed therein.

Embodied article: Constructed such that it has two bearing surfaces each having hydrodynamic pressure generating grooves formed therein (the construction being shown in FIG. 19).

Figure 24:
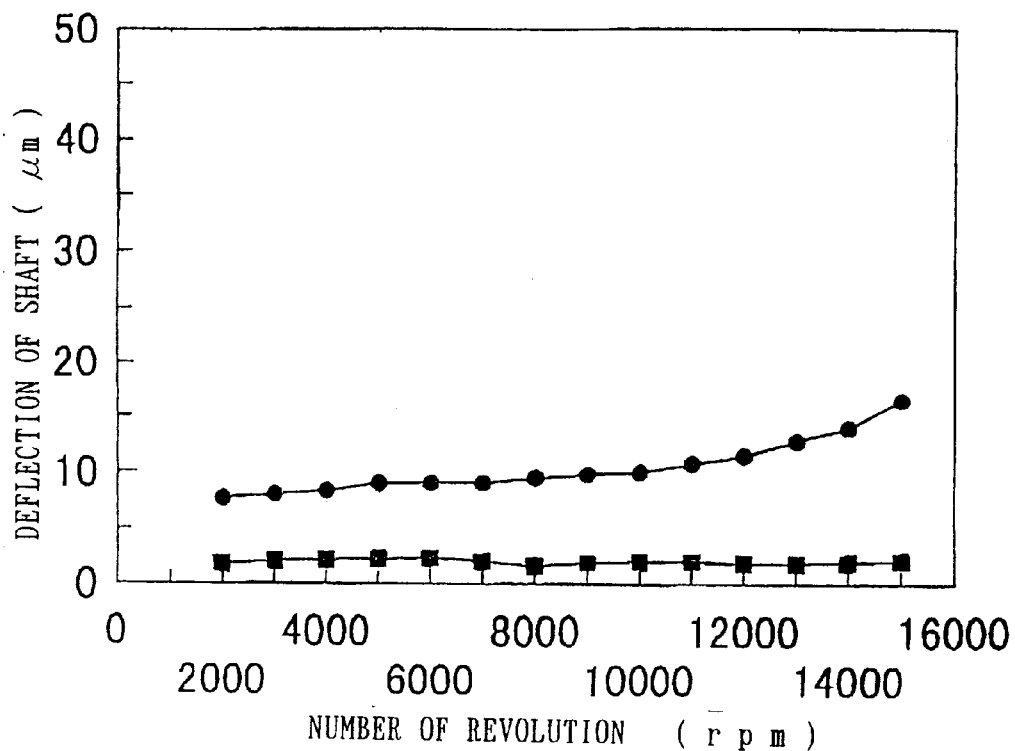

Test results: The test results are shown in FIG. 24. As shown in this figure, the embodied article, as compared with the comparative article, exhibited a superior performance {the mark (■) indicates measured data for the embodied article and (●) for the comparative article).

In addition, the hydrodynamic type porous oil-impregnated bearing having a plurality of bearing surfaces can be produced by the aforesaid method using a core rod or forming pin in which forming patterns corresponding to the shape of the bearing surfaces are formed in a plurality of places on the outer peripheral surface thereof.

What is claimed is:

1. A hydrodynamic porous oil-impregnated bearing comprising a porous bearing body formed with bearing surface on an inner peripheral surface thereof, said bearing surface having inclined hydrodynamic pressure generating grooves and being opposed through a bearing clearance to a slide surface of a shaft to be supported thereby, wherein said bearing flotably supports the slide surface of the shaft by lubricating oil film formed in the bearing clearance, and wherein surface openings are distributed on the bearing surface including the hydrodynamic pressure generating grooves, and wherein the percentage of area of the surface openings is not less than 2% but not more than 20%.

2. A hydrodynamic porous oil-impregnated bearing comprising a porous bearing body formed with bearing surface on an inner peripheral surface thereof, said bearing surface having inclined hydrodynamic pressure generating grooves and being opposed through a bearing clearance to a slide surface of a shaft to be supported thereby, wherein said bearing floatably supports the slide surface of the shaft by lubricating oil film formed in the bearing clearance, and wherein a ratio of a groove depth (h) of the hydrodynamic pressure generating grooves to the bearing clearance (c) is within the range;

$$c/h = 0.5 \sim 4.0.$$

3. A hydrodynamic porous oil-impregnated bearing as set forth in claim 1 or wherein said porous blank is formed of a sintered metal.

4. A hydrodynamic porous oil-impregnated bearing as set forth in claim 3, wherein said sintered metal contains copper or iron, or both as a main component.

* * * * *